United States Patent Office 3,333,018
Patented July 25, 1967

3,333,018
PROCESS FOR POLYMERIZATION UTILIZING ALKYLIDENEHYDROXYHYDROPEROXIDES
Oliver W. Burke, Jr., 506 Intracoastal Drive, Fort Lauderdale, Fla. 33304, and Eldon E. Stahly, Pompano Beach, Fla.; said Stahly assignor to said Burke
No Drawing. Filed Nov. 19, 1963, Ser. No. 324,835
16 Claims. (Cl. 260—683.15)

This invention relates to the production of polymers, and particularly, but not exclusively, to the production of unsaturated liquid polymers of polymerizable conjugated diene monomers containing from 4 to 8 carbon atoms. The polymers may be homopolymers or copolymers of ethylenically unsaturated monomer materials, and in the case of dienic polymers may be liquid homopolymers or copolymers of such dienes or liquid copolymers of a substantial proportion of one or more such dienes with one or more other copolymerizable ethylenically unsaturated monomer materials. Such liquid polymers are useful in the formation of protective coatings, inks, adhesives, etc.

An object of the present invention is to provide a new process for the polymerization of ethylenically unsaturated monomer material characterized in that the polymerization of the monomer material is effected with the aid of alkylidenehydroxyhydroperoxide having from 2 to 6 carbon atoms, and especially with the aid of the sec-$C_3$ to $C_4$ alkylidenehydroxyhydroperoxides, as catalyst, preferably in homogenous mixture with lower molecular weight alcohol, e.g., alcohol containing from 1 to 6 carbon atoms, preferably 1 to 4 carbon atoms, with or without the presence of diluent material such as $C_2$ to $C_6$ carbonyls, other peroxy compounds and minor proportions of other ingredients.

More particularly, the present process comprises
(a) Forming a homogenous reaction solution comprising, by weight,
(1) 100 parts polymerizable ethylenically unsaturated monomer material (preferably with 10 to 200 parts alcohol and most preferably with 30–50 parts thereof) and
(2) 0.5 to 10 parts alkylidenehydroxyhydroperoxide (preferably 1–5 parts and most preferably 2–4 parts),
(b) Heating said mixture
(1) at a temperature in the range of above 100 to 200° C. (preferably 105 to 150° C. and most preferably 115 to 130° C.),
(2) for from 10 minutes to 10 hours,
(3) to a conversion of the monomer material to polymer of at least 35%, (preferably about 50 to 75%) and,
(c) Recovering the formed polymer material,
(d) Said ethylenically unsaturated monomer material preferably comprising by weight at least 10% (most preferably from over 50% to 100%) conjugated diene monomer material containing from 4 to 8 carbon atoms, and
(e) Said alkylidenehydroxyhydroperoxide containing from 2 to 6 carbon atoms (and preferably being a sec-alkylidenehydroxyhydroperoxide containing 3 to 4 carbon atoms).

The invention resides in the new process and in the polymers produced thereby, as herein described and exemplified, and as more particularly pointed out in the appended claims.

The conjugated diene monomers which may be employed contain and are polymerizable through a plurality of $>C=C<$ group and contain from 4 to 8 carbon atoms. These monomers preferably are selected from the group consisting of butadiene-1,3
isoprene
2-methoxy-butadiene-1,3
piperylene (pentadiene-1,3)
2,3-dimethyl-butadiene-1,3
1,1-dimethyl-butadiene-1,3
1,4-dimethyl-butadiene-1,3
the trimethyl and tetramethyl butadiene-1,3's
chloroprene
cyclopentadiene, and the like.

Among the ethylenically unsaturated monomer materials which may be polymerized per se or may be copolymerized with said diene monomers are the compounds containing and polymerizable through an individual $>C=C<$ group, set forth in Burke et al. U.S. Patent No. 3,085,074 dated Apr. 9, 1963, at col. 5, line 60 to col. 7, line 21. Preferably these monomers are selected from the class consisting of the polymerizable vinyl, vinylidene and allyl compounds. Particularly suitable are the polymerizable vinylbenzenes, vinylcyanides, vinylamides, vinylpyridines, vinylpyrrolidone, halogen substituted ethylenes and propylenes, alkyl-vinyl-ethers, alkyl-vinyl-ketones; acrylic acids and their esters; vinyl acetate; allyl alcohol and its esters; and combinations of any two or more members of the foregoing. As herein used, the aforesaid terms designate the groups consisting of the members here named—

*Vinylbenzenes:* styrene, alpha-methylstyrene and the ring substituted styrenes and alpha-methylstyrenes having one to two $C_1$ to $C_6$ alkyl substituents, and the like.

*Vinyl cyanides:* acrylonitrile and methacrylonitriles and the like.

*Vinyl amides:* acrylamide, methacrylamide, and the mono-and di-($C_1$ to $C_6$ alkyl)-N-substituted acrylamides and methacrylamides, and the like.

*Vinyl pyridines:* vinyl pyridines and the ring substituted vinyl pyridines having one to two $C_1$ to $C_6$ alkyl substituents, and the like.

*Halogen substituted ethylenes and propylenes:* vinyl chloride, vinyl fluoride, vinylidene chloride, vinylidene fluoride, trichloroethylene, trifluorochloroethylene, and trifluoropropylene, and the like.

*Alkyl-vinyl-ethers:* The ($C_1$ to $C_6$ alkyl)-vinyl-ethers,

*Alkyl-vinyl-ketones:* methylvinylketone, methylisopropenylketone, and the like.

*Acrylic acids and their esters:* acrylic acid, the alpha-($C_1$ to $C_6$ alkyl)-substituted acrylic acids, the beta-($C_1$ to $C_6$ alkyl)-substituted acrylic acids, and the $C_1$ to $C_{12}$ alkyl esters of these acrylic acids; and the like.

*Allyl alcohol and its esters:* allyl alcohol, and the mono-and di-allyl esters of $C_2$ to $C_{12}$ mono- and di-carboxylic acids, and the like.

Also among the ethylenically unsaturated monomer materials are the drying oil substances which may be interpolymerized with ethylenically unsaturated monomer materials with the aid of the alkylidenehydroxyhydroperoxides and alcohols hereof. The term drying oil substances as herein used is limited to (1) the drying oils including linseed, perilla and fish oils and especially those drying oils containing conjugated unsaturation, e.g., tung oil, oiticica oil, conjugated linseed oil, conjugated soya bean oils, dehydrated castor oil, isano oil, etc., (2) the bodied drying oils, whether from conjugated or nonconjugated oils and whether bodied by heat and/or catalytically, and (3) the fatty acids and/or dimers, trimers and tetramers thereof, derived from such conjugated or bodied drying oils. While the drying oil substances are not to be regarded as monomers for the purpose of forming hompolymers, they are ethylenically unsaturated monomers to the extent that they can be interpolymerized with monomers set forth above, and the term "ethylenically unsaturated monomer material" which is generic to the conjugated dienes and other hereinbefore named monomers, is to be understood accordingly.

Among the alkylidenehydroxyhydroperoxides containing from 2 to 6 carbon atoms employed as polymerization catalysts according to this invention are those in which the alkylidene group is ethylidene, 1-propylidene, 2-propylidene, 1-butylidene, 2-butylidene, 2-methyl-1-propylidene, 1-pentylidene, 2-pentylidene, 3-pentylidene, 2-methyl-1-butylidene, 3-methyl-2-butylidene, 3-methyl-1-butylidene, 2,2-dimethyl-1-propylidene, 1-hexylidene, 2-hexylidene, 3-hexylidene, 2-methyl - 1 - pentylidene, 3-methyl-1-pentylidene, 3-methyl-2-pentylidene, 4-methyl-1-pentylidene, 4-methyl-2-pentylidene, 2,2 - dimethyl-1-butylidene, 2,3-di-methyl-1-butylidene, 3,3-dimethyl - 2 - butylidene, 3,3-dimethyl-1-butylidene. Of these, the secondary alkylidenehydroxyhydroperoxides containing from three to four carbon atoms are preferred, namely: 2-propylidenehydroxyhydroperoxide and 2-butylidenehydroxyhydroperoxide. Mixtures of any two or more of the foregoing alkylidenehydroxyhydroperoxides may be employed, as may mixtures of any of the foregoing alkylidenehydroxyhydroperoxides with catalysts of the organic peroxide, organic hydroperoxide, and hydrogen peroxide types heretofore employed as polymerization initiators. The alkylidenehydroxyhydroperoxides are preferably employed in combination with alcohols containing 1 to 6 carbon atoms with or without the presence of ketones containing 3 to 6 carbon atoms, or aldehydes containing 2 to 6 carbon atoms, or both, as is hereinafter exemplified. The alkylidenehydroxyhydroperoxides are preferably employed with alcohols and/or carbonyls of corresponding structure with or without some hydrogen peroxide and/or water. The polymerizations with the alkylidenehydroxyhydroperoxides with or without hydrogen peroxide may be promoted by traces of transition metal salts, especially cobalt salts, with or without complexing agents such as phosphates, pyrophosphates and the like. The alkylidenehydroxyhydroperoxides may be employed in the present invention in relatively pure state, or as crude materials of sufficient concentrations.

The lower molecular weight alcohols usable in accordance with the present invention are those having 1 to 6 carbon atoms, preferably the mono-hydroxy alcohols having 1 to 4 carbon atoms, and include, but are not restricted to the following:

methanol
ethanol
1-propanol
2-propanol
1-butanol
2-butanol
iso-butanol
tert-butanol These alcohols may be used individually or in combination of two or more thereof, or in mixtures with minor proportions of diluents, especially in mixtures with water and/or $C_5$ to $C_{10}$ hydrocarbon and/or carbonyl components in which the alcohol predominates, but anhydrous conditions are frequently desirable.

In accordance with the present invention reaction materials are combined in a homogenous phase in substantially the following proportions:

| Component | Proportion, parts by weight | | |
|---|---|---|---|
| | Range | Preferred Range | Most Preferred Range |
| Dienic monomer | 100 | 100 | 100 |
| Alcohol (when used) with or without minor proportion of diluent | 10-200 | 25-100 | 30-50 |
| Alkylidenehydroxyhydroperoxide catalyst | 0.5-10 | 1-5 | 2-4 |

The term homogenous phase connotes that all the aforesaid components are in solution in each other. To effect the polymerization, the reaction mixture is heated in the temperature range of above 100° C. to 200° C., preferably 105 to 150° C., most preferably 115 to 130° C. from 10 minutes to 10 hours to a conversion of monomer to polymer of at least about 35% and preferably about 50 to 75% followed by recovery of the formed polymer.

The polymerizations at above 100° C. are carried out batchwise or continuously in suitable pressure equipment, and the present process of polymerization may be carried out conjointly with the process of copending U.S. application Ser. No. 863,218, filed Dec. 31, 1959, now abandoned, employing hydrogen peroxide in the presence or absence of alcohol. When the polymerization is carried out continuously, the homogeneous reaction mixture is continuously formed and fed through a polymerization zone, and the formed liquid polymer is continuously removed from said zone. The recovery of the polymer may be effected in any suitable manner, i.e., the volatile materials such as monomer, alcohol, etc., may be vaporized, and when desired the residual catalyst can be destroyed with a polymerization short stop agent. If desired, antioxidant and other modifying materials may be added before or after the removal of the volatile materials. The alcohol, when used, is readily separated from the polymer, e.g., by heating and vaporizing, and may be recycled.

Preparation of graft copolymers and terpolymers may be effected by the present process in a two-step or multi-step polymerization. A first monomer material or mixture, e.g., one comprising a diene, can be initially charged with the alkylidenehydroxyhydroperoxide catalyst and partially polymerized, and then one or more additional monomers such as styrene, acrylonitrile, acrylic acid, methacrylic acid, acrylamide, and the like or mixtures of 2 or more such monomers can be charged and the polymerization is then continued to the desired conversion.

The dienic monomer material when herein employed for producing liquid polymer comprises at least 10% of conjugated diene monomer material with not more than 90% mono-ethylenically unsaturated co-monomer material, and preferably contains from 30 to 100% conjugated diene monomer material, most preferably from at least 50% to 100% conjugated diene monomer material. By varying the concentrations of these components and the percentages of conversion and the temperature and time of the reaction within the aforesaid ranges, liquid polymers may be obtained having viscosities at 30° C. in the range of from 30 to 30,000 poises, preferably 500 to 5000 poises, and the term liquid polymers is herein used in this sense.

A further understanding of the invention may be obtained from the following specific examples, which, however, are to be taken as illustrative and not restrictive of the invention, the scope of which is pointed out in the appended claims.

*Example 1*

In a 5-gallon aluminum lined reactor is placed a solution of the following composition:

| | Grams |
|---|---|
| 2-propylidenehydroxyhydroperoxide | 165 |
| Hydrogen peroxide | 60 |
| Isopropanol | 1890 |
| Acetone | 125 |
| Water | 40 | and there is charged thereto

| | Grams |
|---|---|
| Butadiene-1,3 | 4410 |
| Methacrylic acid | 90 | and copolymerization is conducted under agitation for 1 hour at 130° C. There is then added

| | Grams |
|---|---|
| Styrene | 1500 | and the polymerization is continued with agitation for 1.5 hours at 130° C.

On vacuum stripping there is obtained about 3960 grams of water-white liquid polymer (66% yield) having a Brookfield viscosity at 30° C. of about 1375 poises.

Example 2

Repetition of Example 1, but polymerizing the monomers with 230 grams of 2-propylidene-hydroxyhydroperoxide in 2000 grams of isopropanol also yields a brilliant water-white viscous liquid polymer with a yield of 60%, based on monomers charged.

Example 3

To a 5-gallon aluminum lined reactor is charged 1000 grams of a solution (designated A–VI–138 by applicant) of the following approximate composition:

| | |
|---|---|
| 2-propylidine-hydroxyhydroperoxide ____grams__ | 20 |
| Hydrogen peroxide _____do____ | 67 |
| Isopropanol _____do____ | 705 |
| Acetone _____do____ | 185 |
| Water _____do____ | 23 |
| 85% phosphoric acid _____ml__ | 0.011 |
| 6% cobalt naphthenate _____gram__ | 0.016 | and to this solution is added 6000 grams of butadiene and polymerized with agitation at 125° C. for two hours. The liquid polybutadiene is recovered, as by stripping out solvent residues by a single pass through a Kontro wiped film stripper at 140° C. and 30″ of vacuum, and yields about 3400 grams (57% yield based on monomers) of water-white liquid polymer of approximately 354 poises (Brookfield 30° C.).

Example 4

To the 5-gallon aluminum lined reactor is charged 1000 grams of a solution of the following approximate composition:

| | Grams |
|---|---|
| 2-butylidene-hydroxyhydroperoxide _____ | 250 |
| Methanol _____ | 2000 |

To this solution is charged 6000 grams of isoprene, and polymerized with agitation at 130° C. for three hours. Stripping yields a polymer in about 50% yield, based on monomers, with a viscosity of about 500 poises (Brookfield 30° C.).

Example 5

Repetition of Example 1, without methacrylic acid, and with the styrene replaced by mixed vinyl toluenes (Dow Chemical Co.,) charged simultaneously with the butadiene, and with the polymerization continued for the full two and one half hours with no interruption, produces water-white polymer in about 60% yield based on monomers and of Brookfield viscosity (30° C.) about 2000 poises.

Example 6

In the 5-gallon reactor employed in Example 1 is placed a solution having the following composition:

| | Grams |
|---|---|
| 2-ethylidenehydroxyhydroperoxide _____ | 190 |
| Hydrogen peroxide _____ | 60 |
| 2-Butanol _____ | 322 |
| Methyl-ethyl-ketone _____ | 155 |
| Water _____ | 40 | and thereafter is charged 5900 grams of butadiene and 100 grams of acrylonitrile. After polymerization with agitation at 115° C. for four hours and stripping, a copolymer of about 70% conversion based on monomers is obtained having a Brookfield viscosity (30° C.) of somewhat above 1000 poises.

Example 7

To the aluminum lined five-gallon agitated pressure reactor is charged a solution having the following composition:

| | Grams |
|---|---|
| 2-propylidenehydroxyhydroperoxide _____ | 300 |
| Hydrogen peroxide _____ | 35 |
| Isopropanol _____ | 3100 |
| Water _____ | 70 | to which is further charged

| | Grams |
|---|---|
| Butadiene-1,3 _____ | 4200 |
| Raw linseed oil _____ | 700 |
| Isano oil _____ | 350 |

Polymerization at 118° C. for 2 hours and vacuum stripping yields 3730 g. of pale yellow viscous liquid polymer.

Example 8

This example is carried out like Example 3 except that the phosphoric acid is omitted and further 1200 g. of the butadiene is replaced by 1200 g. of dehydrated castor oil having a Gardner-Holdt viscosity G–H. The amount of pale yellow product after vacuum stripping is about 3500 g. and its viscosity at 30° C. is in the range of 500–600 poises.

Example 9

Repetition of Example 3, but with the isopropanol replaced by an equal weight of acetone produces a yield of polymer of about 45%, and also of low viscosity.

Example 10

Repetition of Example 6, substituting for the monomers a mixture of 4800 grams butadiene and 1200 grams acrylonitrile and polymerizing at 115°–120° C. for about 2 hours to about 75% conversion of the monomers to polymer, produces a solid butadiene/acrylonitrile copolymer.

By replacing components used in the foregoing examples with other components grouped therewith in the foregoing general description and by varying the conditions of polymerization within the limits above set forth, other exemplification of the present invention are obtained.

Thus, while there have been described herein what are at present considered preferred embodiments of the invention it will be obvious to those skilled in the art that minor modifications and changes may be made without departing from the essence of the invention. It is therefore to be understood that the exemplary embodiments are illustrative and not restrictive of the invention, the scope of which is defined in the appended claims, and all modifications that come within the meaning and range of equivalency of the claims are intended to be included therein.

We claim:

1. A process for forming a polymer which comprises
   (a) forming a homogenous reaction mixture comprising, by weight,
      (1) 100 parts polymerizable ethylenically unsaturated monomer material, and
      (2) 0.5 to 10 parts of alkylidenehydroxyhydroperoxide, and
   (b) heating said mixture
      (1) at a temperature in the range of from above 100 to 200° C.
      (2) for from 10 minutes to 10 hours,
      (3) to a conversion of monomer material to polymer of at least 35%, and
   (c) recovering the formed polymer,
   (d) said alkylidenehydroxyhydroperoxide containing from 2 to 6 carbon atoms.

2. A process according to claim 1, wherein said alkylidenehydroxyhydroperoxide is 2-propylidenehydroxyhydroperoxide.

3. A process according to claim 1, wherein said alkylidenehydroxyhydroperoxide is 2-butylidenehydroxyhydroperoxide.

4. A process according to claim 1, wherein the reaction mixture further comprises 10 to 200 parts by weight of $C_1$ to $C_6$ alcohol per 100 parts of monomer material.

5. A process according to claim 4, wherein said alcohol is present in admixture with at least one material selected from the group consisting of the $C_5$ to $C_{10}$ hydrocarbons, the $C_2$ to $C_6$ carbonyl compounds, and water, in which admixture the alcohol predominates.

6. A process according to claim 1, wherein said alkylidenehydroxyhydroperoxide is 2-propylidenehydroxyhydroperoxide and said reaction mixture further comprises 10 to 200 parts by weight of isopropanol per 100 parts of monomer material.

7. A process according to claim 6, wherein said isopropanol is present in admixture with acetone.

8. A process according to claim 1, wherein said alkylidenehydroxyhydroperoxide is 2-butylidenehydroxyhydroperoxide and said reaction mixture further comprises 10 to 200 parts by weight of 2-butanol per 100 parts of monomer material.

9. A process according to claim 8, wherein said 2-butanol is present in admixture with methylethylketone.

10. A process according to claim 1, wherein said ethylenically unsaturated monomer material comprises, by weight, at least 10% conjugated diene monomer containing from 4 to 8 carbon atoms.

11. A process according to claim 10, wherein said ethylenically unsaturated monomer material comprises at least 50% by weight of the conjugated diene monomer material.

12. A process according to claim 11, wherein said ethylenically unsaturated monomer material comprises substantially 100% by weight of conjugated diene monomer material.

13. A process according to claim 1, wherein the homogenous reaction mixture is continuously formed and fed through a polymerization zone, and wherein the formed liquid polymer is continuously removed from said zone.

14. A process according to claim 1, in which a part of the ethylenically unsaturated monomer material is first charged to the reaction mixture and after partial polymerization thereof the remainder of said monomer material is charged.

15. A process according to claim 1, in which the ethylenically unsaturated monomer material comprises conjugated diene monomer material and mono-ethylenically unsaturated monomer material and in which said monomer material is charged in a plurality of steps with partial polymerization therebetween, and in which at least a part of said conjugated diene monomer material is charged in the first of said steps.

16. A process according to claim 15, in which only conjugated diene monomer material is charged in the first of said steps.

References Cited
UNITED STATES PATENTS

| | | | |
|---|---|---|---|
| 2,118,864 | 5/1938 | Reppe et al. | 260—86.1 |
| 2,377,752 | 6/1945 | Britton et al. | 260—94.2 X |
| 2,551,641 | 5/1951 | Seger et al. | 260—680 X |
| 2,586,594 | 2/1952 | Arundel et al. | 260—680 |
| 2,795,618 | 6/1957 | Emerson et al. | |
| 2,818,437 | 12/1957 | Wildi et al. | |
| 2,937,127 | 5/1960 | Garwood | 260—683.15 X |
| 3,230,235 | 1/1966 | Moore et al. | |

DELBERT E. GANTZ, *Primary Examiner.*

G. J. CRASANAKIS, R. H. SHUBERT,
*Assistant Examiners.*